I. Low, Cultivator.

No. 109229  Patented Nov 15 1870

Witnesses:
D. S. Mabee
Alex. L. Roberts

Inventor:
I. Low
per Munn & Co.
Attorneys.

UNITED STATES PATENT OFFICE.

ISAAC LOW, OF EAST FAIRFIELD, OHIO, ASSIGNOR TO HIMSELF AND EPHRAIM PHILLIPS, OF CROSS CUT, PENNSYLVANIA.

IMPROVEMENT IN CULTIVATORS.

Specification forming part of Letters Patent No. 109,229, dated November 15, 1870.

*To all whom it may concern:*

Be it known that I, ISAAC LOW, of East Fairfield, in the county of Columbiana and State of Ohio, have invented a new and useful Improvement in Cultivators; and I do hereby declare that the following is a full, clear, and exact description thereof, which will enable others skilled in the art to make and use the same, reference being had to the accompanying drawings, forming part of this specification.

Figure 1:
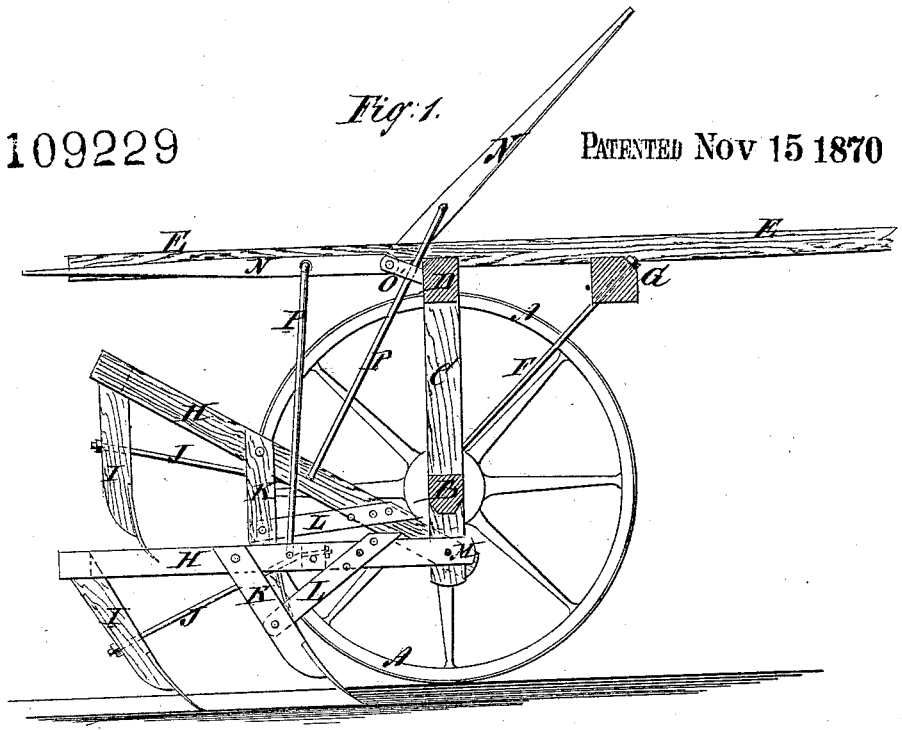
Figure 2:
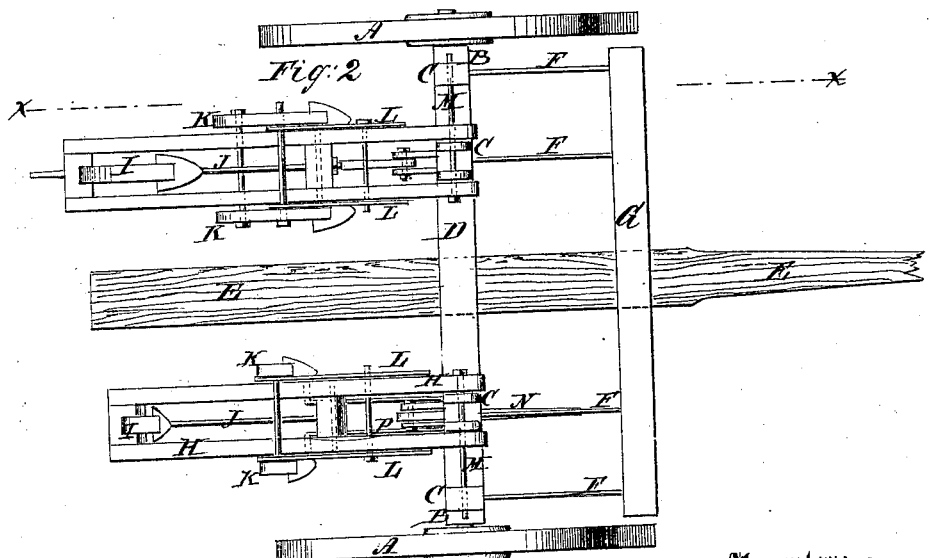

Figure 1 is a vertical longitudinal section of my improved cultivator, taken through the line $xx$, Fig. 2. Fig. 2 is an under side view of the same.

Similar letters of reference indicate corresponding parts.

My invention has for its object to furnish an improved cultivator simple in construction, effective in operation, and conveniently operated; and it consists in the construction and combination of various parts of the cultivator, as hereinafter more fully described.

A are the wheels, which revolve upon the journals of the short axles B, which are securely attached to the lower ends of the two pairs of standards C, the upper ends of which are securely attached to the end part of the cross-beam D, so as to leave the middle part of the frame-work unobstructed for the passage of the row of plants being cultivated.

To the middle part of the cross-beam D is attached the tongue E, which projects in the rear of said cross-beam, and which is made broad, and is rounded off to serve as a seat for the driver, so that his weight may balance the machine. The draft-strain upon the standards C is sustained by the inclined brace or draft rods F, the lower ends of which are secured to the lower parts of the standards C, and the upper ends of which are secured to the end parts of the cross-beam G, the middle part of which is secured to the tongue E in front of the cross-beam D, as shown in Figs. 1 and 2.

H are the cultivator-frames, each of which is formed by connecting two longitudinal bars to each other by two short cross-bars, as shown in Fig. 2, the front cross-bar being set back from the ends of the longitudinal bars, as shown.

I is the rear plow-standard, the upper end of which is attached to the rear cross-bars of the frame H, and the draft-strain upon it is sustained by the inclined brace J, the rear end of which is attached to the lower part of said standard, and the upper ends of which are attached to the forward cross-bar of said frame.

K are the forward standards, the upper ends of which are attached to the opposite sides of the frame H, directly opposite to each other, as shown in Fig. 2. The draft-strain upon the standards K is sustained by the brace or draft bars L, the lower ends of the which are attached to the lower parts of the standards K and their upper ends to the side bars of the frames H, as shown in Figs. 1 and 2. The forward ends of the frames H are pivoted to the lower ends of the standards C by long bolts M, passing through the ends of the said frames and standards, as shown in Fig. 2. The cultivator-frames H may be adjusted farther apart or nearer together by shifting the position of the forward ends of said frames H upon the bolts M. For convenience in doing this, the lower ends of the inner standards, C, are notched, as shown in Fig. 2, so that the end of the inner side bar of said frame may be inserted in said notch when desired.

N are levers, the inner or forward ends of which are pivoted to ears O, attached to the cross-beam D.

P are looped bars, the loop or bend of which passes through a hole in the said levers, and the lower ends of which are pivoted to the side bars of the frames H, as shown in Figs. 1 and 2.

By this construction, when the machine is at work, the levers N will extend back nearly horizontally, and by raising the free ends of said levers the plows will be raised from the ground.

By turning the levers N upward and forward, as shown in Fig. 1, the plows will be locked in a raised position, for convenience in passing from place to place.

Having thus described my invention, I claim as new and desire to secure by Letters Patent—

1. The combination of the levers N and pivoted loops or connecting-rods P with the cross-beam D and cultivator-frames H, substantially as herein shown and described, and for the purpose set forth.

2. The arrangement of the wheels A, axle B, standards C, tongue E, cross-beams D G, braces F, double plow-frames H, standards K, braces J L, rods M, levers N, and rods P, constructed as and for the purpose described.

ISAAC LOW.

Witnesses:
J. W. REYNOLDS,
H. B. STEEN.